United States Patent [19]

Bowen et al.

[11] 4,373,995

[45] Feb. 15, 1983

[54] PYROLYSIS SYSTEM UTILIZING PYROLYTIC OIL RECYCLE

[76] Inventors: Mack D. Bowen, 910 Reed Rd., SE., Smyrna, Ga. 30080; Kenneth R. Purdy, 1485 Leafmore Ridge, Decatur, Ga. 30033

[21] Appl. No.: 308,818

[22] Filed: Oct. 5, 1981

Related U.S. Application Data

[62] Division of Ser. No. 212,041, Dec. 3, 1980, Pat. No. 4,317,703.

[51] Int. Cl.³ .................. C10B 15/00; C10B 39/06; C10B 49/06; C10B 53/02
[52] U.S. Cl. ........................... 202/95; 202/99; 202/214; 202/215; 202/227
[58] Field of Search ............. 201/1, 2.5, 4, 25, 28, 201/30, 34, 35, 39, 44; 252/421; 202/85, 95, 99, 108, 208, 214, 215, 227

[56] References Cited

U.S. PATENT DOCUMENTS

| | | | |
|---|---|---|---|
| 1,973,913 | 9/1934 | Sperr | 201/39 |
| 3,970,524 | 7/1976 | Funk | 201/2.5 |
| 4,145,256 | 3/1979 | Bowen | 201/25 |
| 4,165,289 | 8/1979 | Borst | 201/25 |
| 4,230,602 | 10/1980 | Bowen et al. | 252/421 |
| 4,260,473 | 4/1981 | Bauer | 201/25 |
| 4,263,099 | 4/1981 | Porter | 201/39 |

FOREIGN PATENT DOCUMENTS

| | | |
|---|---|---|
| 19641 | 12/1980 | European Pat. Off. |
| 1321069 | 6/1973 | United Kingdom |
| 1364519 | 8/1974 | United Kingdom |
| 1520041 | 8/1978 | United Kingdom |

OTHER PUBLICATIONS

M. D. Bowen et al., "A Vertical-Bed Pyrolysis System", Reprinted from ACS Symposium Series, No. 76, Solid Wastes and Residues, 3/3/78.

*Primary Examiner*—Bradley Garris
*Attorney, Agent, or Firm*—Stuart S. Bowie; Ira S. Dorman

[57] ABSTRACT

A pyrolysis process and system produces a solid residue and a clean, enriched fuel gas. In the process, the pyrolytic oil and filter cake are recycled in such a manner as to produce products of optimal value, and to minimize the need for servicing and downtime of the system. Recycling of water recovered in the process may also be employed to achieve enrichment of the gaseous product. The process may be carried ou in such a manner as to produce a non-polluting wastewater stream that can be discharged directly from the system.

12 Claims, 3 Drawing Figures

PYROLYSIS SYSTEM UTILIZING PYROLYTIC OIL RECYCLE

This application is a division of application Ser. No. 212,041, filed Dec. 3, 1980, now U.S. Pat. No. 4,317,703.

BACKGROUND OF THE INVENTION

It is well known that organic, and in particular cellulosic, materials can be pyrolyzed to produce valuable solid residue products, including charcoal and activated carbon, as well as gaseous and liquid fuels. Exemplary of the prior art that describes such processes is Bowen U.S. Pat. No. 4,145,256; a pyrolysis process specifically adapted for the production of highly activated carbon is disclosed in Bowen and Purdy application for U.S. Pat. Ser. No. 84,294, filed on Oct. 12, 1979, and now issued as U.S. Pat. No. 4,230,602 on Oct. 28, 1980.

In such a process, and depending upon the conditions of operation and the volumes of gases introduced (e.g., air and steam) and generated, there will normally be a significant amount of particulate solids entrained in the offgas stream. Since the desired liquid and gaseous products are obtained from the offgas stream, and since it is necessary that such products be relatively free from such contamination, it is important that these particles be removed. This is, of course, a well-recognized problem, which has in the past been dealt with in a number of ways.

For example, the gas stream may be passed from the reactor into a cyclone separator for the purpose of removinb the solid particles, and then treated in a condenser and demister. However, because pyrolysis offgases contain significant amounts of tars and oils, in addition to the particulate solids, condensation on the walls of any such equipment is considerable, and becomes excessive after relatively short periods of operation. The deposits of condensates and solids must be removed periodically to allow satisfactory operation, necessitating not only significant and frequent periods of downtime for servicing of the system, but also representing an arduous, unpleasant and hazardous task that must be performed manually.

As an alternative to such a "dry" offgas treatment, water scrubbing has also been employed. However, as conventionally practiced that approach also suffers from serious disadvantages, outstanding among which are the need to treat the wastewater to make it environmentally acceptable and to recover from it as much as possible of the valuable organic constituents, such recovery being inhibited to a considerable extent because as much as 60 percent of the condensed organics are in solution. Thus, the separation requires the provision of a wastewater treatment plant, which represents not only a large capital expenditure but also an inconvenient and expensive added operation.

In view of such disadvantages, it has been suggested that the gas stream be cleansed by scrubbing it with the pyrolytic oil. Doing so may obvisously avoid the introduction of, and hence the need to treat, water, and it inherently enables the recovery of at least some of the oil. Furthermore, since the oil itself functions as a natural solvent for condensible fractions of the offgas stream, those fractions of the deposits are readily dissolved, thereby removing them and washing the particles from the interior walls of the system, thus continuously maintaining proper operating conditions without need for regular manual cleaning.

Notwithstanding the advantages of such a procedure, as far as is known there has not heretofore been such an implementation of it as will permit practical operation on a continuous basis. Moreover, it is not believed that there has to date been developed such a system or method, which utilizes pyrolytic oil scrubbing for the production of products of optimal value, and especially enriched gases.

Accordingly, it is a principal object of the present invention to provide a novel, continuous process, and a novel system for carrying out the same, for pyrolyzing a cellulosic material so as to produce pyrolytic oil, a solid residue, and a cleansed, enriched gaseous product.

It is a more specific object of the invention to provide such a process and system in which the pyrolytic oil produced is utilized as the scrubbing medium to remove particulate solids from the gas stream, to thereby avoid problems attendant to the use of dry and conventional water-scrubbing cleansing techniques.

Another object of the invention is to provide a process and a system of the foregoing nature, in which the characteristics of the recycled pyrolytic oil stream may automatically be controlled, to either permit or prevent dehydration of the oil, so as to ensure optimal operation and the attainment of the foregoing objects.

Yet another object is to provide such a novel method and system wherein a portion of the water vapor condensed from the gaseous product may be discharged directly, as a non-polluting wastewater stream.

A further object of the invention is to provide a process and system having such features and advantages, which is also convenient, efficient and relatively simple and inexpensive to carry out and to use.

SUMMARY OF THE INVENTION

It has now been found that certain of the foregoing and related objects of the invention are readily attained in a continuous process for producing a solid residue and a clean, enriched gaseous product from a cellulosic material that pyrolyzes to a solid residue and a gaseous mixture, which gaseous mixture comprises condensible and noncondensible fractions, the condensible fraction comprising condensible organic vapors and water vapor. The process comprises the continuous pyrolysis of such a material as a moving packed bed, in which bed the temperature varies and passes through a maximum value of about 760° to 1150° Celsius at an intermediate level. The products include a solid residue and a gaseous mixture; the gaseous mixture has entrained in it a significant amount of fine particles of the residue, and it is at a temperature of about 110° to 400° Celsius. Pyrolytic oil is injected into the gaseous mixture to scrub the residue particles from it and to effect condensation of a portion of the condensible fraction thereof, thereby enabling recovery of a relatively clean gaseous product and a pyrolytic oil mixture containing the residue particles. The resultant pyrolytic oil mixture is filtered to separate it into an oil portion and a filter cake, with the latter containing pyrolytic oil and residue particles in a weight ratio of about 1 to 10:1. The filter cake is recycled for treatment by introducing it into the bed; introduction will generally be at a level at which the temperature is at least about 260° Celsius, preferably it will be above the aforesaid "intermediate" level, and most desirably the filter cake will be introduced at a subsurface level that is at least about two feet beneath the surface, since these conditions promote cracking of the oils, as will normally be highly desirable. The oil portion of the pyrolytic oil mixture is recycled to provide the injected pyrolytic oil used for scrubbing. Similarly, a substantial amount of the organic vapors and the water vapor present in the gaseous mixture after scrubbing is condensed the recovered, and at least part of the condensate is recycled by injecting it into the residue at the bottom of the bed, to effectively quench the same. The recycling steps are controlled, with respect to the rate of introduction of the cellulosic feed material, so as to produce both an enriched gaseous product and also a net yield of pyrolytic oil, the latter amounting to at least three percent, based upon the weight of dry feed.

In preferred embodiments of the foregoing process, the feed of cellulosic material will comprise wood waste, the temperature at the intermediate level of the bed will be about 875° to 1000° Celsius, the gaseous mixture will have a temperature of about 120° to 370° (and most desirably about 135° to 200°) Celsius, the viscosity of the recycled oil (i.e., the oil as introduced into the scrubber) will be maintained at a value of about 20 to 175 centipoise, its temperature will be about 10° to 45° Celsius, and the residue will be quenched to a temperature of about 100° Celsius. The process may include the additional steps of monitoring the recycled oil to determine its temperature and viscosity, automatically maintaining the viscosity of the oil at 5 to 265 centipoise, by adjusting the rate of flow thereof, and simultaneously maintaining the temperature of the recycled oil at about 20° to 40° Celsius. Other steps of the process may involve demisting of the gaseous mixture exiting from the oil scrubber/condenser, to remove the aerosol fractions therefrom for filtration along with the pyrolytic oil mixture, and monitoring of the water from the condensation and recovery operations, to determine the organic content thereof and to thereby enable adjustment of the rate of flow of the recycled oil so as to achieve a preselected value of organic substances therein.

In especially preferred embodiments of the invention, the water recovered in the initial water vapor condensation and recovery step will be fully utilized in the process, with substantially no portion thereof being removed therefrom as a wastewater stream. Generally, the recovered condensate will be received in a holding vessel, and recycle will conveniently be controlled by maintaining a preselected level therein. Most desirably, a further portion of the recovered condensate will be recycled by introducing it into the pyrolytic oil separated in the filtering operation.

In those embodiments in which recovered water is recycled, especially by introduction into the scrubbing oil stream, it will be particularly advantageous to effect a second water condensation subsequent to the first, to remove a major proportion of the water vapor contained in the gaseous mixture. The condensate from the second water condensation will usually be substantially free from contamination, and therefore suitable for discharge directly from the system. Thus, the process may be used to produce a solid residue, a relatively dry, purified gaseous product, and a relatively clean wastewater stream.

The process may beneficially be carried out with the pyrolytic scrubbing oil recycled at a rate such that substantial hydration of the gaseous mixture, and a corresponding partial dehydration of the recycled oil, occurs. Alternatively, the recycling rate of oil may be such as to substantially avoid its dehydration. In either case, the temperature of the oil mixture after scrubbing will be about 40° to 75° Celsius; however, the preferred temperature for the dehydrated oil is 55° to 68° Celsius, whereas the preferred value for the second case, in which substantial dehydration of the oil is avoided, is about 45° to 52° Celsius.

Additional objects of the invention are readily attained in a system for carrying out the continuous pyrolysis of a cellulosic feedstock of the nature previously described. The system employs a reactor for continuously effecting pyrolysis of the feed as a descending packed bed, the reactor having inlets for feed, filter cake, reaction air and char-quenching water, and having outlets for offgases and the char or other solid residue product. Oil scrubber/condenser means is connected to the offgas outlet of the reactor, and at least initial water condenser means is provided in the offgas stream of the oil scrubber/condenser means. The system also includes means for recycling condensate from the water condenser means to the quench water inlet of the reactor, filter means in the liquid stream from the oil scrubber/condenser, means for recycling filter cake from the filter means to the filter cake inlet of the reactor, means for recycling pyrolytic oil from the filter means to the oil scrubber/condenser means, and means for controlling the rates of recycle of the condensed water, filter cake and pyrolytic oil. Hence, the system is adapted for the production of an enriched gaseous product and pyrolytic oil from such a cellulosic feed material.

In preferred embodiments of the system, the filter cake feed inlet of the reactor is spaced downwardly from the top thereof, so as to permit introduction at a level below the normal upper surface of the bed established therein. More specifically, the reactor may include means for distributing the feed material and for maintaining the upper surface of the bed at a predetermined level, with the feed inlet being disposed for introduction of the filter cake feed material at a level at least about two feet therebelow.

The system may additionally include a demister in the offgas stream between the oil scrubber/condenser means and the initial water condenser means, with the liquid outlet from the demister being connected to the filter means. It may have means for injecting the condensate from the water condenser means into the stream of pyrolytic oil recycled to the oil scrubber/condenser means, and a holding vessel to receive the condensate and to supply water to the reactor and to the recycled pyrolytic oil stream may be provided. The system may additionally include a second or final water condenser connected to the first or initial water condenser, to receive and further dry the clean offgas exiting therefrom, and the final condenser may advantageously be of a direct water-contact type (i.e., a water scrubber/condenser). Finally, a thermal energy transfer device, through which the stream of recycled pyrolytic oil passses, may be employed to enable control of the temperature thereof.

DETAILED DESCRIPTION OF THE ILLUSTRATED AND PREFERRED EMBODIMENTS

Figure 1:
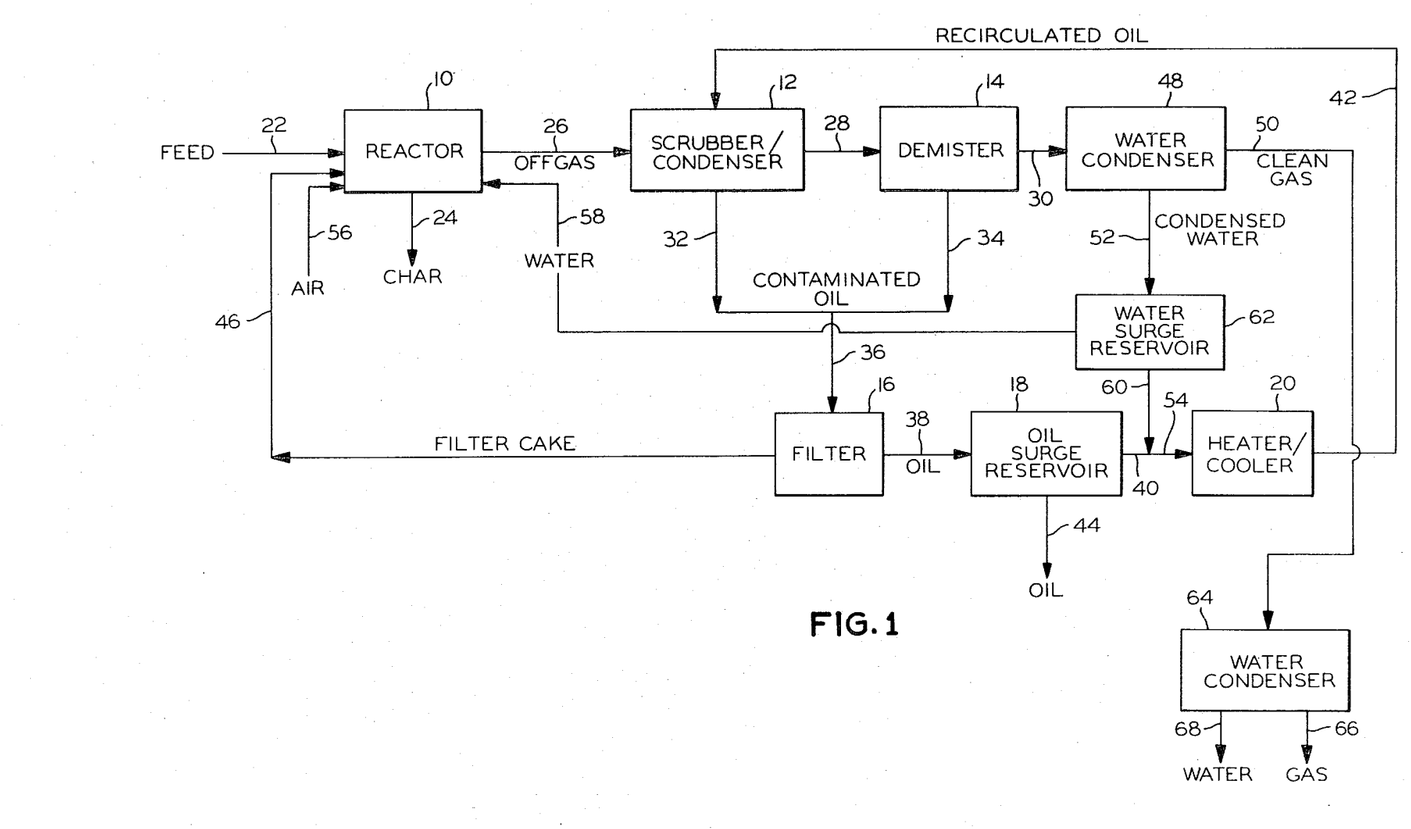
FIG. 1 is a schematic representation of a system embodying the present invention, and adapted for the practice of the several embodiments of the process hereof.

Turning now in detail to FIG. 1 of the appended drawings, the system illustrated comprises a pyrolysis reactor 10, an oil scrubber/condenser 12, a demister 14, a first water condenser 48, a water surge reservoir 62, a second water condenser 64, a filter 16, an oil surge reservoir 18, and a heater/cooler 20. The reactor 10 is of the vertical, moving, packed-bed type described in detail in the above-identified Bowen patent and Bowen and Purdy application, the relevant portions of which are hereby incorporated by reference; the nature of reactor 10 will be evident, and further description is not believed to be necessary here. The feedstock is introduced through line 22 and is deposited upon the upper surface of the bed, and the reactor 10 will normally be provided with a leveling device to uniformly distribute the fresh feed material. During its descent through the reactor, the feedstock is pyrolyzed. The solid residue produced is quenched and discharged from the bottom through line 24, and the generated gases (including water vapor from quenching and also from reaction of the cellulosic feed material) flow upwardly through the bed; the resultant gaseous product is withdrawn through conduit 26.

Upon entering the oil scrubber/condenser 12, the offgas stream is scrubbed with oil, as will be discussed in greater detail hereinafter. Suffice to say here that the oil scrubbing serves the dual function of removing solid particles from the gas stream while also effecting condensation of portions of the condensible organic vapors and of the moisture contained therein. From the scrubber/condenser 12, the treated gas is conducted through line 28 into the demister 14, where any residual aerosols are mechanically removed, to produce a relatively clean gas, which exists from the demister 14 through line 30 and enters the initial water condenser 48 and thereafter the final water condenser 64, wherein condensation of additional moisture is effected (as will be more fully discussed hereinbelow). The condensate (essentially water, but containing a significant amount of condensed organics) from the initial water condenser 48 passes into the surge reservoir 62, from which it may be withdrawn as desired (as will also be discussed more fully hereinafter). Although not illustrated, it will be appreciated that an appropriate fan or blower will be provided in the offgas system to maintain a draft sufficient to withdraw the gas streams therethrough; consequently, the reactor 10 will normally operate at slightly below atmospheric pressure.

Contaminated (i.e., particulate-containing) oil streams 32, 34 flow respectively from the oil scrubber/condenser 12 and the demister 14, and are combined for introduction through line 36 into a rotary vacuum filter 16. In the filter 16, the solid residue particles are removed from the oil, which is then discharged through line 38 into the oil surge reservoir 18. Part of the pyrolysis oil held in tank 18 is withdrawn through line 40 for recirculation to the oil scrubber/condenser 12 through line 42, passing first through the heater/cooler 20 to adjust its temperature to an appropriate value, as dictated by the conditions of operation. The pyrolytic oil passing through line 40 may have water from the reservoir 62 injected into it through line 60, thus providing a higher moisture content scrubbing medium, if so desired. Alternatively, the oil may pass unadulterated to the unit 20 and the oil scrubber/condenser 12; these alternative embodiments will also be more fully discussed hereinbelow. In any event, the rest of the oil is withdrawn from the surge tank 18 through line 44, for delivery to bulk storage as the product oil. It might be noted at this point that adding water to the oil permits its partial dehydration during scrubbing, thereby greatly increasing the cooling capacity of the scrubbing medium and, in turn, greatly reducing the flow of oil through the oil scrubber/condenser. In such a case, the oil exiting the oil scrubber/condenser will have a lower moisture content than that of the oil entering the same unit.

Some of the recovered water may be withdrawn from the surge reservoir 62 through line 58, with the amount thereof being that necessary to cool the solid residue residing at the bottom of the reactor 10 to a desirable temperature (e.g., about 100° Celsius), thereby typically producing a moisture content in the residue of about four to five weight percent, on a wet basis. This reduces the moisture content of the product gas by an amount proportional to the production rate of the solid residue, thereby further enhancing the heating value of the product gas, and making the process essentially independent of any external water supply. Nevertheless, quench water may be added to the process from an external source (not shown), such as city water connected into the water line 58.

The filter cake is removed from the filter 16 through line 46, and is recycled to the reactor 10 for introduction, preferably at a subsurface level. While relative positions are suggested in FIG. 1, no attempt has been made to depict therein the actual placement of the feed, filter cake and water recycle lines, 22, 46 and 58 with respect to the depth of the bed or position within the reactor.

Regardless of whether or not the system includes the initial water condenser 48, it may beneficially include the final water condenser 64, so as to remove water vapor from the gas passing through line 50 and thereby produce a dried gas 66, since such moisture represents an inert fraction that will substantially reduce the heating value of the ultimate product. Such a condenser 64 is, however, especially desirable in cooperation with the condenser 48, since the latter will serve to remove organic contaminants from the gas (which are then returned to the reactor 10 and the scrubber 12 in the water flowing through lines 58, and normally also in the hydrated oil flowing in line 42), resulting in a relatively uncontaminated water stream from condenser 64, which may be sufficiently clean to permit direct discharge without undesirable or impermissible environmental effects.

With final regard to FIG. 1, it will be noted that air is introduced into the reactor 10 through line 56 (which will, in practice, usually comprise grids of tubes at several levels). This will establish the maximum temperature zone within the pyrolysis bed, and will significantly affect (by virtue of location, distribution, and air flow rate) the nature of the process and of the products produced. While the filter cake will normally be introduced above the maximum temperature level (in this instance, the relative positions are indicated in the figure by the lines 46 and 56), that will not necessarily be the case. The sensible heat of the char in the lower portions of the bed may be entirely adequate to effect substantial cracking of the pyrolytic oil in the filter cake (as is important for maximum enrichment of the gas), and the filter cake may therefore be introduced low in the bed, as long as the residence time (prior to discharge from the reactor 10 with the solid residue product) is not unduly brief.

In the water recycle process, automatic control may be achieved by setting the flow rate of the scrubbing oil stream 42, with the temperature of the oil being automatically adjusted to maintain the temperature of the contaminated oil stream 36 at a value compatible with partial dehydration of the scrubbing oil. The moisture content of the filtered oil stream 38 may be continuously monitored by viscosity measurement (as will hereafter be more fully described). If the oil is dehydrating excessively, relative to the desired moisture content, the flow rate of the make-up water stream 60 is incrementally increased until the desired moisture content is obtained; if it is hydrating, the opposite action is automatically taken to correct the condition.

Further, noting that the flow rate of the condensate stream 58 is determined by the rate of production and the moisture content of the solid residue product, and that the flow rate of the oil hydrating stream 60 is determined by the oil moisture content, it is seen that a simple water level detector in the surge reservoir 62 will be adequate to control the degree of cooling of the fuel gas stream 50 in the water condenser 48. In addition, in order to properly divide the gas stream cooling between the oil scrubber/condenser 12 and the water condenser 48, the organic content of the condensed water stream 52 may be continuously monitored. If it is increasing from the desired value, the flow rate of the scrubbing oil stream is incrementally increased and/or the oil temperature is decreased, thereby increasing the degree of gas stream cooling in the oil scrubber/condenser and demister, and concomitantly increasing the condensation and recovery of organics in those units; this ultimately results in a decrease in the organics recovered in the water condenser 48. If the organic content of the condensed water stream 52 is found to be decreasing from its desired value, the opposite action is automatically taken. Finally, the flow rate of the product oil stream 44 and the oil level in the oil surge reservoir 18 may be monitored to control the flow rate of pyrolytic oil recycled to the reactor 10 as filter-cake oil in stream 46; if desired, oil from line 44 can be added to the filter cake being returned to the reactor in line 46. The degree of enrichment of the fuel gas stream 50 is, of course, directly related to this rate. Periodic sampling of the fuel gas for composition and/or heating value determinations is used to relate the oil recycle rate to the degree of enrichment, which serves as a calibration and quality control procedure.

To automatically control the process carried out without water recycle, the flow rate of the scrubbing oil stream 42 is again set, and the temperature of the scrubbing oil stream 42 is automatically adjusted to maintain the temperature of the contaminated oil stream 36 at a value suitable for minimal oil dehydration. The proper scrubbing oil flow rate is also similarly determined by continuously monitoring the moisture content of the filtered oil stream 38. If the oil is dehydrating relative to its desired moisture content, the scrubbing oil flow rate is incrementally increased and/or the oil temperature decreased, until the rate is such that the desired oil moisture content can be maintained. If the oil is hydrating, the opposite action is automatically taken to correct the condition.

Exemplary of the efficacy of the present invention are the following specific examples.

EXAMPLES 1, 2 & 3

A predried mixture of hogged, or chipped, hardwood feedstock, containing about seven percent moisture on a wet basis, is introduced into the top of a vertical reactor of the type described hereinbefore, in a system of the sort illustrated in FIG. 1 of the drawings. Air is distributed throughout a volume at an intermediate zone of the bed, with the upper air tubes about three feet below the surface, and the solid residue is continuously withdrawn from the bottom of the reactor at such a rate as to maintain the bed depth at a substantially constant value of about eight feet. The reaction mass attains a maximum temperature of approximately 950° Celsius at the intermediate zone of the bed, and the solid residue product is discharged at a temperature of about 100° Celsius, after quenching with recycled water.

The offgas from the reactor has particulate solid residue entrained in it, which is substantially removed therefrom in the oil scrubber/condenser, utilizing as the scrubbing medium the pyrolytic oil produced in the process, admixed with recycled water. The scrubbed gas is subsequently demisted, and the oil streams from the oil scrubber/condenser and demister are mixed and then filtered, utilizing a standard rotary filtering device from which the filter cake is removed on a continuous basis. The filter cake is recycled to the reactor, and is introduced thereinto by a ram device or by a tubular screw, at a level about two feet below the bed surface (at which point the temperature is high enough to crack a substantial portion of the oil contained in the filter cake, as will be discussed more fully hereinafter).

The oil fraction produced by the filtration operation is discharged into the surge tank, from which it (with the water injected thereinto) is recirculated to the scrubber/condenser, with its temperature being so adjusted as to maintain the desired operating conditions. To do so, the temperature is continuously monitored, as are the viscosity and moisture content of the oil stream, as described. Based upon the existing conditions, the oil stream is either heated or cooled, as need be, and conditions of the system are appropriately adjusted so as to maintain desired values of viscosity and moisture content therein. The so controlled oil is continuously sprayed into the scrubber/condenser to effect cleaning of the offgas stream and condensation of the condensible fractions thereof. After passing through the demister, the clean gas is passed through the initial water condenser, optimally through the second, and recovered and evaluated for cleanliness and heating value; it is found to be substantially free of solid particles, and to be well suited for use as a gaseous fuel.

Set forth in Table 1 below are the specific data and parameters for the three Examples so performed, but in which the gas is not subjected to a second water vapor condensation:

TABLE ONE

| Stream No. | Substance | Temp. | Example: 1 | 2 | 3 |
|---|---|---|---|---|---|
| | | | Mass Flow Rate | | |
| 22 | Feed | 16 | 3,226 | 3,226 | 3,226 |
| | Dry Feed | | 3,000 | 3,000 | 3,000 |
| | Moisture | | 226 | 226 | 226 |

TABLE ONE-continued

| Stream No. | Substance | Temp. | Example: 1 Mass Flow Rate | Example: 2 Mass Flow Rate | Example: 3 Mass Flow Rate |
|---|---|---|---|---|---|
| 56 | Process | 16 | 641 | 641 | 641 |
| 58 | Char Quench Water | 16 | 217 | 217 | 217 |
| 46 | Filter Cake | 38 | 261 | 435 | 967 |
|  | Dry Solids |  | 87 | 87 | 87 |
|  | Dry Oil |  | 148 | 296 | 748 |
|  | Moisture |  | 26 | 52 | 132 |
| 24 | Product Char | 100 | 854 | 854 | 854 |
|  | Dry Char |  | 811 | 811 | 811 |
|  | Moisture |  | 43 | 43 | 43 |
| 26 | Offgas Stream | 149 | 3491 | 3665 | 4197 |
|  | Particulate Solids |  | 87 | 87 | 87 |
|  | New Pyrolysis Prod. |  |  |  |  |
|  | Dry Cond. Oil |  | 667 | 667 | 667 |
|  | Dry Noncond. Oil |  | 38 | 38 | 38 |
|  | Noncond. Gas |  | 1193 | 1193 | 1193 |
|  | Water Vapor |  | 1332 | 1332 | 1332 |
|  | Cracked Oil Prod. |  |  |  |  |
|  | Dry Cond. Oil |  | 31 | 62 | 158 |
|  | Dry Noncond. Oil |  | 16 | 33 | 83 |
|  | Noncond. Gas |  | 117 | 233 | 590 |
|  | Water Vapor |  | 10 | 20 | 49 |
| 42 | Scrubbing Oil | 38 | 5875 | 6141 | 6960 |
|  | Dry Oil |  | 4700 | 4913 | 5567 |
|  | Moisture |  | 1175 | 1228 | 1393 |
| 36 | Contaminated Oil | 66 | 6438 | 6725 | 7607 |
|  | Particulate Solids |  | 87 | 87 | 87 |
|  | Dry Oil |  | 5398 | 5642 | 6392 |
|  | Moisture |  | 953 | 996 | 1128 |
| 38 | Filtered Oil | 60 | 6177 | 6290 | 6640 |
|  | Dry Oil |  | 5250 | 5347 | 5644 |
|  | Moisture |  | 927 | 943 | 996 |
| 40 | Dehydrated Scrubbing Oil | 54 | 5530 | 5781 | 6550 |
|  | Dry Oil |  | 4700 | 4913 | 5567 |
|  | Moisture |  | 830 | 868 | 983 |
| 44 | Product Oil | 54 | 647 | 509 | 90 |
|  | Dry Oil |  | 550 | 433 | 77 |
|  | Moisture |  | 97 | 76 | 13 |
| 30 | Oil Scrubbed/ Demisted Gas | (1) | 2928 | 3081 | 3550 |
|  | New Pyrolysis Prod. |  |  |  |  |
|  | Dry Noncond. Oil |  | 38 | 38 | 38 |
|  | Noncond. Gas |  | 1193 | 1193 | 1193 |
|  | Water Vapor |  | 1332 | 1332 | 1332 |
|  | Cracked Oil Prod. |  |  |  |  |
|  | Dry Noncond. Oil |  | 16 | 33 | 83 |
|  | Noncond. Gas |  | 117 | 233 | 590 |
|  | Water Vapor |  | 10 | 20 | 49 |
|  | Oil Dehydr. Water Vapor |  | 222 | 232 | 265 |
| 60 | Oil Hydrating Water | 16 | 345 | 360 | 410 |
| 50 | Product Fuel Gas | (2) | 2366 | 2504 | 2923 |
|  | New Pyrolysis Prod. |  |  |  |  |
|  | Dry Noncond. Oil |  | 38 | 38 | 38 |
|  | Noncond. Gas |  | 1193 | 1193 | 1193 |
|  | Cracked Oil Prod. |  |  |  |  |
|  | Dry Noncond. Oil |  | 16 | 33 | 83 |
|  | Noncond. Gas |  | 117 | 233 | 590 |
|  | Water Vapor |  | 1002 | 1007 | 1019 |

In the foregoing Table, the "Stream No." refers, of course, to FIG. 1 of the drawings; temperatures are expressed in degrees Celsius, and the mass flow rates are in units of pounds per hour. The temperatures of product gas entering (stream 30, note "1") and exiting (stream 50, note "2") from the water condenser 48 vary, and are 88° and 83° for Example 1, 87° and 82° for Example 2 and 85° and 79° for Example 3, respectively.

As will be appreciated, the principal variant among the three Examples lies in the amount of pyrolytic oil recycled to the reactor. In all cases, however, the temperature prevailing at the point of filter cake recycle (about 275° Celsius) is such as the crack about 79 weight percent (based upon the weight of the dry filter cake oil) of the pyrolytic oil to noncondensible gases and vapors. More particularly, in Example 1 the solids content of the filter cake is 33.3 weight percent; at a dry solids rate of 87 pounds per hour, this represents a moist oil recycle rate of 174 pounds per hour. In Example 2 the solids content of the filter cake is 20 weight percent and the dry solids rate is held at 87 pounds per hour, providing a moist oil recycle rate of 348 pounds per hour. Finally, in Example 3 the solids content is such that the product oil yield is at a minimum practical value, i.e., three weight percent. At a dry solids rate of 87 pounds per hour, the filter cake contains nine weight percent of solids and the moist oil recycle rate is at its maximum value of 880 pounds per hour. Additional runs are carried out in which the gaseous products of the foregoing Examples are further dried, using a final water condenser. The properties of the several gaseous products, both before and after final drying, are discussed in greater detail hereinbelow.

EXAMPLES 4 & 5

The same feedstock and system is used to carry out two additional examples, the significant difference from the foregoing being the elimination of the water recycle features, with oil scrubbing being carried out with minimal dehydration of the oil. Thus, the water condenser 48 and surge reservoir 62 are eliminated, with water for quenching the char being supplied from an external source (still at a flow rate sufficient to reduce the char to a discharge temperature of about 100° Celsius). As between Examples 4 and 5, they differ essentially in that the filter cake in Example 4 is returned to the upper surface of the bed together with the feed, thereby recovering the filter cake oil, whereas in Example 5 recycle is to the same level as in Examples 1 through 3, thereby effecting cracking a substantial portion of the filter cake oil. Both gases are relatively free from particulates; however, as will be seen, the fuel value of the gas of Example 5 is significantly enhanced over that of Example 4. The operating parameters for these two Examples are set forth in Table Two, below:

TABLE TWO

| Stream No. | Substance | Temp. | Example: 4 Mass Flow Rate | Example: 5 Mass Flow Rate |
|---|---|---|---|---|
| 22 | Feed | 16 | 3226 | 3226 |
|  | Dry Feed |  | 3000 | 3000 |
|  | Moisture |  | 226 | 226 |
| 56 | Process Air | 16 | 641 | 641 |
| 58 | Char Quench Water | 16 | 217 | 217 |
| 46 | Filter Cake | 38 | 261 | 261 |
|  | Dry Solids |  | 87 | 87 |
|  | Dry Oil |  | 148 | 148 |
|  | Moisture |  | 26 | 26 |
| 24 | Product Char | 100 | 854 | 854 |
|  | Dry Char |  | 811 | 811 |
|  | Moisture |  | 43 | 43 |
| 26 | Offgas Stream | 149 | 3491 | 3491 |
|  | Particulate Solids |  | 87 | 87 |
|  | Dry Condensible Oil |  | 815 | 698 |
|  | Dry Noncond. Oil |  | 38 | 54 |
|  | Noncondensible Gas |  | 1193 | 1310 |
|  | Water Vapor |  | 1358 | 1342 |
| 42 | Scrubbing Oil | 38 | 44720 | 40568 |
|  | Dry Oil |  | 38012 | 34483 |
|  | Moisture |  | 6708 | 6085 |
| 36 | Contaminated Oil | 54 | 45766 | 41476 |
|  | Particulate Solids |  | 87 | 87 |
|  | Dry Oil |  | 38827 | 35181 |
|  | Moisture |  | 6852 | 6208 |
| 44 | Product Oil | 38 | 785 | 647 |
|  | Dry Oil |  | 667 | 550 |
|  | Moisture |  | 118 | 97 |
| 30 | Product Gas | (3) | 2445 | 2583 |
|  | Noncondensible Gas |  | 1193 | 1310 |

TABLE TWO-continued

| Stream No. | Substance | Temp. | Example: 4 Mass Flow Rate | 5 |
|---|---|---|---|---|
| | Noncondensible Oil | | 38 | 54 |
| | Water Vapor | | 1214 | 1219 |

The units of temperature and mass flow rate are, again, Celsius and pounds per hour, respectively. The specific value of temperature (note "3") for the product gas stream 30 in Example 4 is 87°, whereas it is 86° in Example 5.

It will be observed that the flow rate of scrubbing oil in the latter two Examples is much higher than in the first three, representing one significant disadvantage of the operational mode of Examples 4 and 5, in that the equipment used in the oil subsystem must be considerably larger, and hence more expensive in terms of capital expenditures and operational costs. Moreover, if the product gas of these Examples (i.e., 4 and 5) is dried to enhance its higher heating value, the water recovered would be contaminated with organics, and would therefore present a waste disposal problem. Whereas the process of Example 4 produces more pyrolytic oil than that of Example 5 (because it is simply vaporized from the filter cake at the surface of the bed, and recovered in the oil stream, with little change in composition), the volume and (as will be seen) fuel value of the gaseous product produced by the latter process are both higher (due to cracking of the filter cake pyrolytic oil fraction within the bed), representing the primary advantage of the process of Example 5 over that of Example 4.

From the foregoing, it will be appreciated that gas enrichment is achieved in the instant process through cracking of the pyrolytic oil recycled to the reactor, and/or by removal of recycled water from the system as moisture in the solid residue product, reflected as a net reduction in the amount of water vapor (an inert fraction detrimental to combustion properties) present in the offgas stream. In the preferred embodiment, both effects will be utilized. The degree of gas enrichment is, of course, directly related to the amount of pyrolytic oil recycled to the reactor, and consequently will be maximized when the net production of pyrolytic oil is at a minimum level. Although theoretically possible, cracking of all of the oil produced will not generally occur in the practice of the invention (except, perhaps, on an interim basis), due to the need to maintain the quality of the oil within certain limitations necessary for effective scrubbing and for satisfactory filtration.

The water-recycle embodiments are especially desirable because, as mentioned above, the condensible organic contaminants are removed from the offgas stream and thereafter returned to the reactor (either with the scrubbing oil portion of the filter cake or with the quench water, and preferably in both streams) for ready disposal. Thus, the organics so recovered will either be cracked in the reactor, to report ultimately as noncondensible components of the gas product, or they will be removed with the char or other solid residue, in which product a small amount of such organic substances will not generally be objectionable. In any event, the practical consequence of such recycle is that the moisture may thereafter be removed from the gaseous product (such as in the final water condenser 64 of FIG. 1) and normally discharged directly, without further treatment, as a relatively innocuous and unpolluted wastewater stream.

As will be appreciated, these advantages are a direct result of the sequential scrubbing and condensing steps, coupled with recycle of both pyrolytic oil and also water condensate. Most of the condensible organics are removed from the offgas stream during its passage through the oil scrubber/condenser, either to be recovered as product oil or to be returned with the filter cake for reprocessing (normally cracking). The condensible organic substances remaining in the offgas stream after oil scrubbing are subsequently removed in the initial water condenser, and are recycled either with the oil used for scrubbing of the gas or with the water used for quenching of the solid residue. In any event, those portions that are not removed from the system as moisture in the solid residue are reprocessed in the reactor, either by ultimate recycle with the oil in the filter cake or by voltilization from the hot solid product and passage upwardly through the bed. Since the gases exiting from the initial water condenser are essentially free of condensible organics, a second water condenser can be used to dry the gas (preferably by direct contact), producing a clean wastewater stream.

The offgas streams of embodiments in which oil scrubbing and water-recycling practices are not followed may, of course, also be dried in condenser 64, thereby increasing the higher heating values of the gases produced. However, in those instances the resultant wastewater stream will generally require treatment to remove organic contaminants and to render it environmentally acceptable for discharge.

As indicated, to be suitable for use in the present process the organic feedstock must be capable of thermal decomposition to produce a solid carbonaceous product and a gaseous product containing non-condensible and condensible fractions, including water vapor. As a practical matter, the feedstock should be a waste material that is readily available in ample supply, so as to maximize the economic factors and the benefits of the invention. All things considered, a most desirable material for use in the present process is wood waste (e.g., bark, sawdust, forest harvesting residues and the like) in view of the vast amounts available, the want of optimal end uses, and the value of products that can be produced from it. Other feedstocks are suitable, however, including materials such as sugar cane bagasse, straw, rice hulls, peanut shells and similar agricultural waste materials. While the feed can frequently be used as received, it may be desirable to predry it, to pelletize or otherwise densify it, and/or to reduce its particle size, depending upon the conditions of operation and the nature of the products to be produced.

Of fundamental importance to the process is the composition of the pyrolytic oil product and, in particular, its moisture content. This is so because a primary function served by the oil in the process is to thermally contact and thereby cool the offgas stream, the mechanism of which is essentially and desirably evaporative. Consequently, without sufficient moisture the oil would soon dehydrate completely, devolatilize, and become overheated, causing it to deteriorate and ultimately to become unsuitable for use. On the other hand, and especially in connection with the embodiments of the invention in which water is not recycled, if the amount of moisture is excessive problems attendant to water scrubbing would tend to recur. Thus, up to 50 percent of the pyrolytic oil could be dissolved in the wastewater and thereby lost, the solvent characteristics of the oil would be diminished significantly, and wastewater treatment facilities would be necessary. For the foregoing reasons, the amount of moisture in the pyrolytic oil should be maintained at about 10 to 50, and preferably 15 to 25, percent, based upon the weight of the wet oil.

Insofar as the highly volatile components of the oil are concerned (i.e., those that volatilize to a significant extent under the conditions of operation), if the content were to fall too low the solvent power of the oil as a scrubbing medium would become inadequate to maintain the system free from tarry deposits. While the volatile content of the oil also contributes beneficially to the maintenance of a desirably low viscosity, that is not a critical function, since normally that property can readily be corrected by the addition of water. Obviously, the solvent power of the oil could also be adjusted by introducing appropriate solvents from an independent supply, but that would be impractical as an economic matter, and would in fact frustrate a fundamental advantage of using the pyrolytic oil as the scrubbing medium. For this reason, it is essential to the process that a minimum amount of excess oil be produced on an ongoing basis; otherwise, it would soon become deficient in solvent power because of the constant loss of the highly volatile components that are the primary solvents. Thus, as a practical matter, the conditions of operation must be such as will result in a net production of at least three pounds of new oil for every one hundred pounds of dry feed processed.

A convenient way to determine that the recycled oil contains an appropriate amount of volatile constituents is by measurement of its viscosity. Maintaining that property within certain limits, taken in light of its moisture content, will ensure the quality of the oil; specifically, it must have a viscosity of about 5 to 265, are preferably about 20 to 175, centipoise. The lower values (5 and 20) correspond generally to moisture contents of about 40 and 25 percent, respectively, in oil at a temperature of about 65° Celsius. Conversely, at a temperature of 20° Celsius, the higher values (265 and 175 centipoise) correspond respectively to moisture levels of 10 and 15 percent. By way of further illustration, a satisfactory oil at a temperature of 38° Celsius and containing 15, 20 or 25 percent of water will have respective viscosity values of 70, 40 and 35 centipoise. All things considered, a moisture content of 15 percent in the oil will generally be optimal for operations in which water is not recovered for recycle, and a concentration of about 20 percent will generally be optimal in the alternative embodiments, as providing both a desirable viscosity (with suitable amounts of volatiles present) and also a desirable apparent heat capacity, without introducing water-scrubbing difficulties. In addition to maintaining a net oil production of at least three percent, control of conditions to avoid volatile losses in excess of about 30 (and at the very most 40) weight percent is also desirable to ensure satisfactory operation; this is accomplished primarily be avoiding excessively high temperatures in the several oil streams, such as by increasing flow rates and the like.

The differential in the temperatures of the scrubbing oil and the offgases must, of course, be sufficiently large to ensure that there will be adequate transfer of thermal energy for efficient condensation of the condensible fractions of the offgas stream. Moreover, the temperature of the oil must be low enough to avoid its excessive dehydration and devolatilization; otherwise, the oil will degrade and become unsuitable for effective scrubbing and cooling. Specifically, the oil should be at least 65 Celsius degrees cooler than the offgases, and preferably the differential will be 90 Celsius degrees or greater. On the other hand, the temperature of the oil must be maintained high enough to ensure facile pumping and spraying, and to avoid clogging of nozzles. All factors considered, therefore, the scrubbing oil will generally be used at a temperature in the range of 10° to 45° Celsius, with the preferred temperatures being from about 20° to 40° Celsius.

In practice, the offgases are cooled in the oil scrubber/condenser to within 5 to 10 Celsius degrees of the apparent dew point; however, it is not advisable to allow the temperature of the oil to approach the dew point temperature of the offgas stream. If the oil temperature becomes too high, too much water will be evaporated from the oil into the gas, dehydrating the oil excessively and producing an undesirably wet gas. But again, if the exiting oil temperature is too low (e.g., less than about 43° Celsius), filtration will be difficult if not impossible, as a practical matter (unless of course the oil is otherwise heated), since blinding of the filter could occur at sufficiently low temperatures. For these reasons, the "dirty" oil from the scrubber/condenser will usually have a temperature of about 40° to 75° Celsius, with 52° and 66° representing preferred upper values for the nondehydrating and hydrating cases, respectively. The oil from the demister will typically be at a temperature of about 90° Celsius.

In most instances, the oil from the scrubber/condenser will contain about 15 percent of water, based upon the weight of wet oil. Thus, it will be appreciated that, in the embodiments in which water recycling is not employed the process will be controlled to avoid significant net mass transfer of water in the oil scrubbing operations. On the other hand, in the water-recycle embodiments hydration of the offgas stream does occur, and the scrubbing oil will normally transfer about 25 weight percent of its moisture content thereto (e.g., going from an initial value of 20 percent to 15 percent after scrubbing).

As has previously been mentioned, the filter cake will normally have an oil:solids ratio of about 1 to 10:1, with the practical lower solids limit depending upon the amount of solids carryover, the method of filtering, and the concentration of solids in the oil stream after scrubbing. The oil production and filtration capacity of the system will not normally be adequate to handle carryover amounts higher than 30 to 40 percent of the feed weight. When the pyrolytic oil is produced at a relatively low rate, it will be desirable for the solids carryover to be correspondingly low, so as to ensure that the amount of oil recycled with the filter cake does not create a deficit in the three percent net oil yield parameter of the process. Although a filter aid may be desirable in some instances, the filter cake can itself serve as the filtration medium, provided that a portion of its thickness is removed, as appropriate.

The location at which the filter cake is introduced into the bed has a very significant effect upon the nature of the products ultimately attained, and hence upon the benefits to be derived from the practice of certain embodiments of the process. Thus, while it is entirely feasible to introduce the filter cake together with the feedstock at the top of the bed, so doing has little advantage in terms of improving the fuel products. Under the relatively low temperature conditions that prevail at the surface, the filter cake is subjected essentially only to evaporation, which serves to recover the filter cake oil but not to enhance heating values of the gas significantly. Nevertheless, such a practice may be employed in the water-recycle embodiments of the invention to obtain increased oil yields, with reliance being placed solely upon the water vapor reduction in the offgas stream to effect enrichment, but again the preferred embodiments utilize the combined effects of moisture removal and increased amounts of combustible components in the gas product.

As indicated, introduction of the filter cake at subsurface levels of the bed, where higher temperatures prevail, permits fast heating and consequential cracking of the oil, to produce high heating value hydrocarbon gases, such as propane and butanes. To achieve these benefits, the filter cake will normally be introduced at a level at least two feet beneath the upper surface of the bed and, in any event, at a location at which the temperature is at least 260° Celsius. In this manner, the BTU value of the ultimate gas product can be raised by at least 10 percent.

More particularly, whereas a gaseous product having a heating value of about 150 to 200 BTU per cubic foot is readily attained from more conventional pyrolysis processes, utilizing processes of the present invention enable the production of gases having heating values in the range of 200 to 250 BTU per cubic foot. As will be appreciated by those skilled in the art, the generation of a gas having such a heating value is of great benefit, in view of the relationship that exists between the heating value of a gas and the volume of combustion product gases that it produces upon burning. In gaseous fuels of less than about 200 BTU per cubic foot, the mass of combustion gases generated at stoichiometric conditions, per unit of heat released, increases very rapidly as the heating value of the gas decreases; in gases having a heating value of about 200 BTU per cubic foot or higher, on the other hand, the ratio is fairly constant for most fuels. Consequently, 200 BTU per cubic foot represents what may be regarded as a minimum "break" point above which the most desirable heating gases are provided (this relationship is best seen from the graphic representation of FIG. 2, as will be discussed presently).

Figure 2:
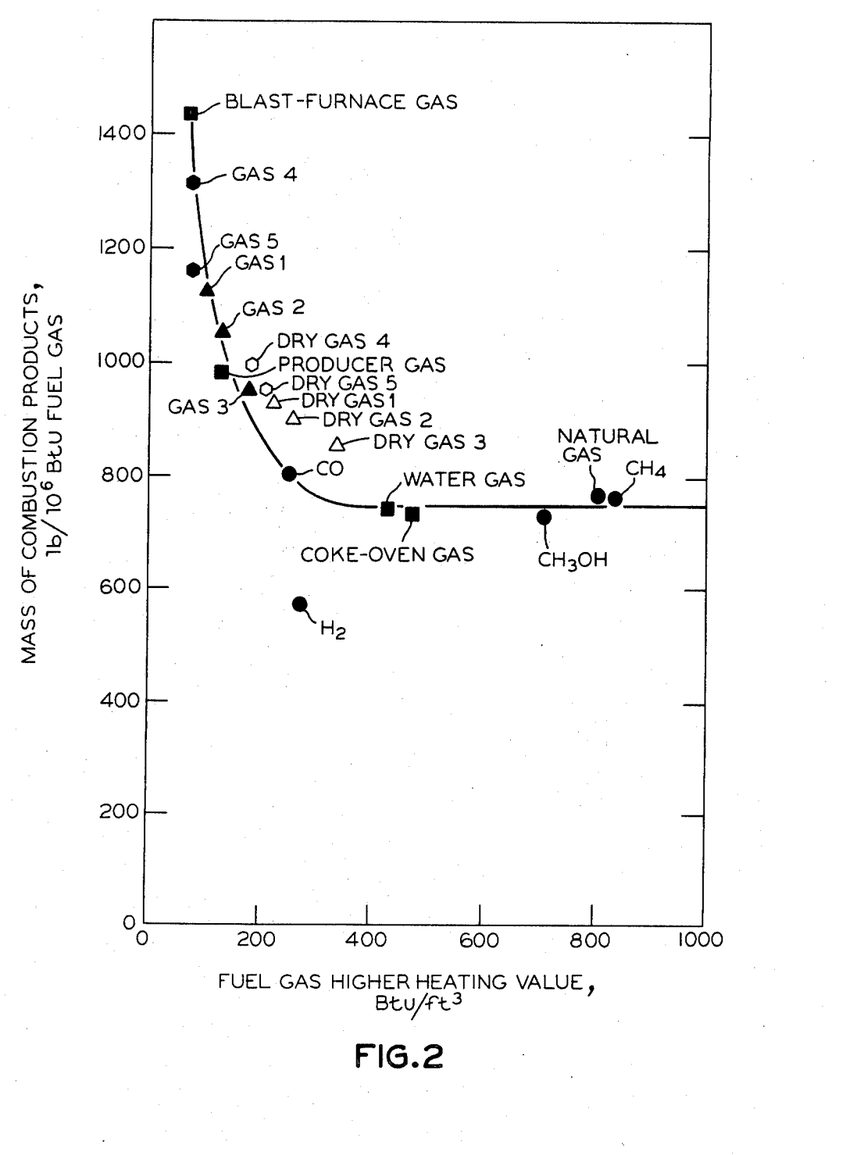
FIG. 2 is a graph of data comparing certain properties of the enriched gaseous products produced in accordance with the invention to those of common gaseous fuels.
Figure 3:
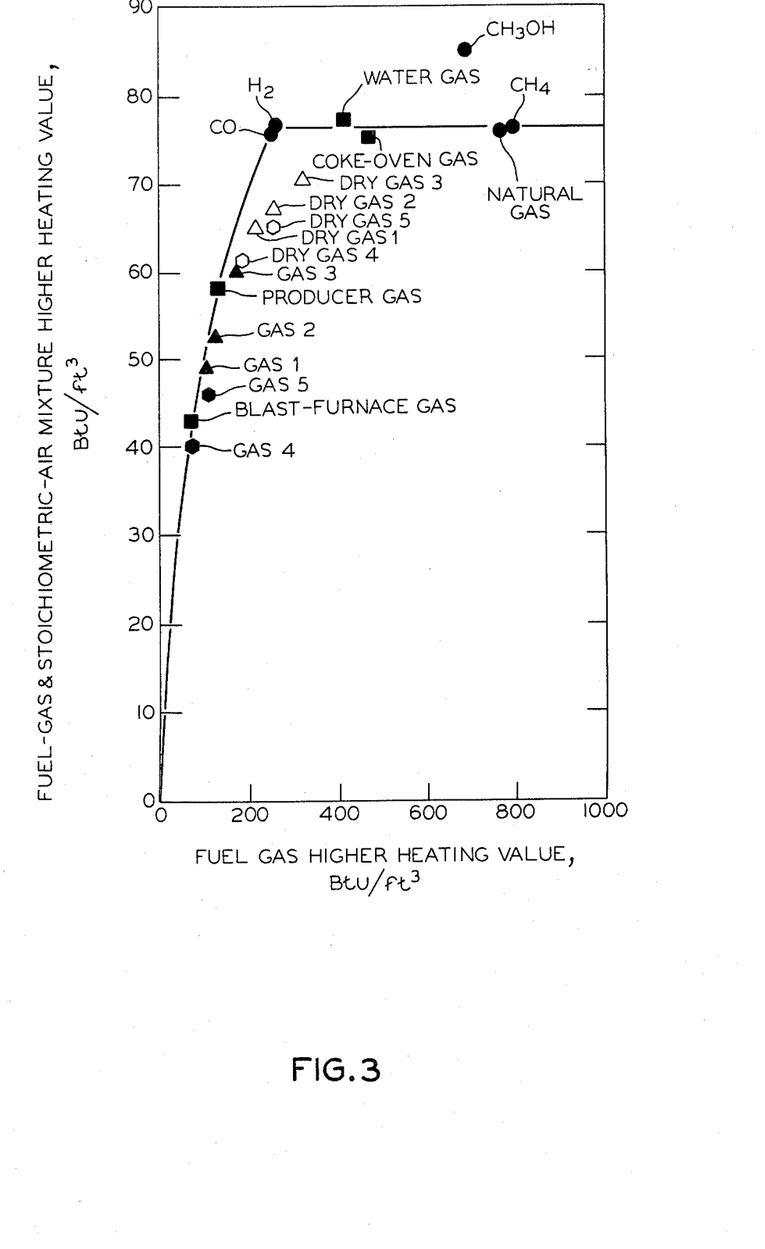
FIG. 3 is a second graph of other data comparing such products.

Thus, with specific reference now to FIGS. 2 and 3, prime benefits of the present invention are readily appreciated. FIG. 2 presents a curve on which are plotted points representing, for several standard gaseous fuels and for products of the instant process, the relationship between the volumetric higher heating value of the gas and the mass of the products produced by its combustion with stoichiometric amounts of air (gas at a pressure of 760 millimeters of mercury and a temperature of 88° Celsius). The curve of FIG. 3 sets forth the relationship between the higher heating values of the same gases and the higher heating value of the mixtures thereof with air in stoichiometric proportions. In the graphs, the products designated "DRY" are the same as those bearing like numbers, but dried by water vapor condensation, as in condenser 64 of FIG. 1 (i.e., the offgas flowing in line 66). These two graphs, taken together, are highly indicative of the degree of interchangability of two fuels in a given application, and of the disadvantages inherent in the use of low-BTU gaseous fuels.

Taking "Texas" natural gas as a standard, despite significant variation in the volumetric higher heating values of other typical fuel gases (e.g., methane, coke-oven gas, water gas), it can be seen that there is practically no difference in either the volumetric higher heating values of their stoichiometric air mixtures, or in the mass of products that are generated, per million BTU, by combustion of such gases. Consequently, from the standpoint of energy content these gases could be interchanged with natural gas without significantly affecting the power output or the thermal efficiency of the heat device (e.g., package boiler, drying kiln, internal combustion engines, etc.).

By-product gases (e.g., those of the present invention) are, however, of quite a different nature. The presence of inert gases, such as carbon dioxide, nitrogen and water vapor, significantly impact both of the foregoing properties. A stoichiometric mixture of blast-furnace gas and air, for example, has only 57 percent of the volumetric energy content of that of natural gas and air, and it produces almost twice (i.e., 1.86 times) the mass of combustion products per unit of fuel energy. Substituting one of these gases for natural gas will, therefore, significantly decrease the power output and thermal efficiency of the heat device.

Hence, on the basis of the foregoing criteria, FIGS. 2 and 3 show that the gases produced in accordance with Examples 1, 2 and 3, and subsequently dried by water condensation, constitute the most desirable substitutes (in the order of increasing value from Dry Gas 1 to Dry Gas 3, reflecting the increasing pyrolytic oil recycle rates thereof) for conventional fuel gases, of any of the gaseous by-products. Of a value equal to that of Dry Gas 1 is Dry Gas 5 (although displaced on the curve for the sake of clarity, and albeit that a significant wastewater disposal problem would be attendant to its production), which is the product produced without water recycle but with the filter cake injected at a subsurface level of the bed. Dry Gas 5 is readily compared to the gaseous product produced in the same way, but with introduction of the filter cake at the top of the bed (Dry Gas 4), which has lower fuel gas and stoichiometric-air mixture higher heating values, and (as would be expected) generates a significantly greater mass of combustion products on a per BTU basis. The value of the remaining products can readily be perceived by reference to the two graphs. In general, it can be seen that the products of water recycle and deep bed injection of the filter cake are superior to those produced using only deep bed injection, and that the least valuable fuel gases are obtained when neither effect is employed.

The quantity and mix of products that can be recovered from the pyrolysis reaction depend upon numerous factors, including oil recycle rate, location of filter cake injection, and the temperature that is maintained in the offgas stream (recognizing, of course, that the measures necessary to control that temperature will, in turn, depend upon several factors, such as the nature and form of the feedstock, its moisture content, the air-to-feed ratio used, rates of production, and the like). In terms of composition, the offgas will normally comprise nitrogen, carbon dioxide, carbon monoxide, hydrogen, methane and higher hydrocarbons, as well as water vapor and vaporized tars and oils. The oil cracking reactions typically produce about 76 weight percent of noncondensible gases and vapors, including fairly large amounts of carbon monoxide and carbon dioxide, with lesser amounts of hydrogen, methane, ethane, propane and butane.

It is of considerable importance that the oil scrubbed product gas temperature be maintained at least five, and preferably eight or more, degrees Celsius above its apparent dew point, so as to avoid excessive moisture condensation in the oil scrubber. Moreover, as the temperature of the offgas approaches its dew point value, most of the condensible organics will be condensed out. In the context of the foregoing, the broad range of initial offgas temperatures within which operation will generally be satisfactory is about 110° to 400° Celsius; typically, the process will be carried out with an offgas temperature of about 120° to 370° Celsius, and most desirably it will be about 135° to 200° Celsius. As outer practical limits, the temperature of the offgas should not be so high as to inhibit production of pyrolytic oil; on the other hand, it must not be so low as to cause the bed to bridge or "lock up" due to the condensation of oil, tar, and water in the relatively cool upper regions thereof. As has been mentioned previously, such control of gas temperature will normally be achieved by variations in the air-to-feed ratio, bed depth, and the like.

In more specific terms, the air-to-feed ratio employed will generally be in the range of about 0.15 to 1.5 pounds of air per pound of dry feed, depending upon many factors, including the products desired, the moisture content and bulk density of the feedstock, etc. For example, the higher ratios will favor low yields of char or other solid residue, whereas values at the lower end of the range will be advantageous from the standpoint of minimizing particulate carryover and maximizing the production of solid residue, should that be desirable. In this regard, it should be appreciated that, although char will often be the desired solid residue produced, other such products may be more desirable in certain instances, and processes for the production thereof are fully within the scope of the present invention.

Thus, it can be seen that the present invention provides a novel, continuous process, and a novel system for carrying out the same, for pyrolyzing a cellulosic material so as to produce pyrolytic oil, a solid residue, and a cleansed, enriched gaseous product. In accordance therewith, the pyrolytic oil produced is utilized as the scrubbing medium to remove particulate solids from the gas stream, thereby avoiding problems attendant to the use of dry and water-scrubbing cleaning techniques. By subjecting the offgases to sequential oil scrubbing and water vapor condensation steps, with recycle of effluents, organic contaminants may either be utilized advantageously or disposed of innocuously, and a considerable amount of water vapor remaining may be condensed to produce a clean wastewater stream that is substantially free of pollutants. The invention also provides a process and a system of the foregoing nature, in which the characteristics of the recycled pyrolytic oil stream may automatically be controlled, to either permit or prevent dehydration of the oil, so as to ensure optimal operation and the attainment of the objects of the invention. In addition to all of the foregoing, the process and system of the invention are convenient, efficient and relatively simple and inexpensive to carry out and to use.

Having thus described the invention, what is claimed is:

1. A system for carrying out the continuous pyrolysis of a feed of cellulosic material capable of pyrolyzing to a solid residue and a gaseous mixture, the solid residue comprising a significant amount of fine particulates and the gaseous mixture comprising fractions that are noncondensible and condensible, the latter including a substantial amount of water vapor, the combination including:
   (a) a reactor for continuously effecting the pyrolysis of such feed, as a descending packed bed, said reactor having inlets for feed, filter cake, reaction air and quenching water, and having outlets for offgases and the solid residue product;
   (b) oil scrubber/condenser means connected to said offgas outlet of said reactor;
   (c) water condenser means in the offgas stream from said scrubber/condenser means;
   (d) means for recycling condensate from said water condenser means to said quench water inlet of said reactor;
   (e) filter means in the liquid stream from said scrubber/condenser means;
   (f) means for recycling filter cake from said filter means to said filter cake inlet of said reactor;
   (g) means for recycling pyrolytic oil from said filter means to said oil scrubber/condenser means for use as the scrubbing medium; and
   (h) means for controlling the rates of recycle of the condensed water, filter cake and pyrolytic oil, whereby the system can be used to produce an enriched gaseous product and pyrolytic oil from such a cellulosic material.

2. The system of claim 1 wherein said filter cake inlet is spaced downwardly from the top of said reactor, so as to permit the filter cake to be introduced thereinto at a level below the normal upper surface of the bed established therein.

3. The system of claim 2 wherein said reactor includes means for distributing the feed material and for maintaining the upper surface of the bed at a predetermined level, said filter cake inlet being disposed for introduction of the filter cake material at a level at least about two feet below said predetermined level.

4. The system of claim 1 additionally including a diameter in said offgas stream between said scrubber/condenser means and said water condenser means, the outlet from said demister being connected to said filter means.

5. The system of claim 1 additionally including means for injecting water from said water condenser means into the stream of pyrolytic oil recycled to said scrubber/condenser means.

6. The system of claim 5 additionally including a holding vessel to receive water from said water condenser means, and from which water is supplied to said reactor and to said recycled pyrolytic oil streams.

7. The system of claim 1 additionally including a second water condenser, said second water condenser being connected to said first water condenser to receive the offgases exiting therefrom, and to effect condensation of water vapor therein.

8. The system of claim 7 wherein said second water condenser is a water scrubber.

9. The system of claim 1 additionally including a thermal energy transfer device through which the stream of recycled pyrolytic oil passes, to enable temperature control thereof.

10. A system for carrying out, without substantial pollution, the continuous pyrolysis of a feed of cellulosic material capable of pyrolyzing to a solid residue and a gaseous mixture, the solid residue comprising a significant amount of fine particulates and the gaseous mixture comprising fractions that are noncondensible and condensible, the latter including substantial amounts of organic vapors and water vapor, the combination including:

(a) a reactor for continuously effecting the pyrolysis of such feed, as a descending packed bed, said reactor having inlets for feed, reaction air and quenching water, and having outlets for offgases and the solid residue product;

(b) oil scrubber/condenser means connected to said offgas outlet of said reactor;

(c) first water condenser means in the offgas stream from said oil scrubber/condenser means;

(d) second water condenser means in the offgas stream from said first water condenser means;

(e) means for recycling condensate from said first water condenser means to said quench water inlet of said reactor;

(f) solids removal means in the liquid stream from said scrubber/condenser means; and (g) means for recycling pyrolytic oil from said solids removal means to said oil scrubber/condenser means for use as the scrubbing medium, whereby the system can be used to produce a relatively dry, purified gaseous product and a solid residue from such a cellulosic material, and a relatively clean wastewater stream.

11. The system of claim 10 wherein said reactor has an inlet for introducing a filter cake into the bed therewithin, wherein said solids removal means comprises filter means, and wherein said system additionally includes means for recycling filter cake said filter means to said filter cake inlet of said reactor.

12. The system of claim 11 wherein said filter cake inlet is disposed to permit introduction of the filter cake at a level below the normal surface of the bed when said system is in operation.

* * * * *